United States Patent [19]

Dorr

[11] Patent Number: 4,938,066
[45] Date of Patent: Jul. 3, 1990

[54] ULTRASONIC APPARATUS FOR MEASURING THE SPEED OF SOUND IN A GASEOUS MEDIUM

[75] Inventor: John A. Dorr, Crofton, Md.

[73] Assignee: Xecutek Corporation, Annapolis, Md.

[21] Appl. No.: 149,816

[22] Filed: Jan. 29, 1988

[51] Int. Cl.⁵ .............................................. G01H 5/00
[52] U.S. Cl. .................................................... 73/597
[58] Field of Search ............... 73/597, 1 DV, 290 V; 367/902, 98, 99

[56] References Cited

U.S. PATENT DOCUMENTS

| | | | |
|---|---|---|---|
| 3,184,969 | 6/1963 | Bolton | 73/290 V |
| 3,482,647 | 11/1968 | Lynch et al. | 73/597 |
| 3,554,014 | 8/1969 | Berg . | |
| 3,834,233 | 11/1972 | Willis et al. | 73/290 V |
| 4,210,969 | 3/1978 | Massa | 73/290 V |
| 4,248,087 | 8/1979 | Dennis et al. | 73/290 V |
| 4,254,478 | 3/1981 | Dumas . | |
| 4,254,660 | 3/1981 | Prause | 73/597 |
| 4,388,708 | 3/1981 | Skrgatic et al. . | |
| 4,448,207 | 11/1981 | Parrish | 73/290 V |
| 4,470,299 | 1/1982 | Soltz | 73/290 V |
| 4,542,652 | 3/1982 | Reuter et al. | 73/597 |
| 4,543,649 | 10/1983 | Head et al. . | |
| 4,578,997 | 7/1984 | Soltz | 73/290 V |
| 4,581,726 | 4/1986 | Makino et al. | 367/99 |
| 4,719,605 | 1/1988 | Eder et al. | 367/98 |
| 4,745,808 | 5/1988 | Hagen | 73/597 |
| 4,769,793 | 9/1988 | Kniest et al. | 367/99 |

Primary Examiner—Jerry W. Myracle
Attorney, Agent, or Firm—Jim Zegeer

[57] ABSTRACT

An ultrasonic apparatus for measuring the speed of sound in a gaseous medium comprises a chamber in which an ultrasonic transducer is mounted at one end of the chamber and first and second ultrasonic reflecting surface are mounted at the opposite end of the chamber with a temperature insensitive mounting member for mounting the second ultrasonic reflecting surface at a predetermined distance closer to the ultrasonic transducer than the first ultrasonic reflecting surface and a circuit connected to the transducer for converting ultrasonic energy reflections from the first and second reflecting surfaces to a signal corresponding to the speed of the ultrasonic energy between the two ultrasonic reflecting surfaces. Thus, the distance from the transducer to the targets is not relevent - only the distance between the two reflectors which is established by the temperature insensitive mounting member is relevant. In a preferred embodiment, the ultrasonic reflecting surfaces are concentric and coaxial and, the chamber includes a cylindrical cylinder which has a diameter larger than the most remote of the two reflecting surfaces and an annular groove is formed beyond the second reflecting surface.

11 Claims, 2 Drawing Sheets

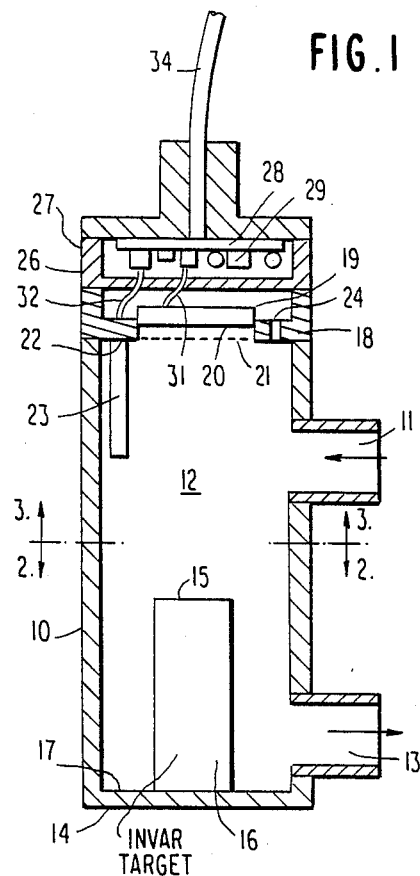
FIG. 1
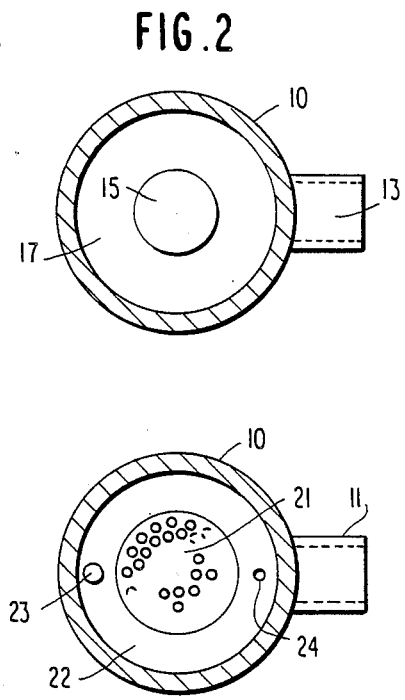
FIG. 2
FIG. 3
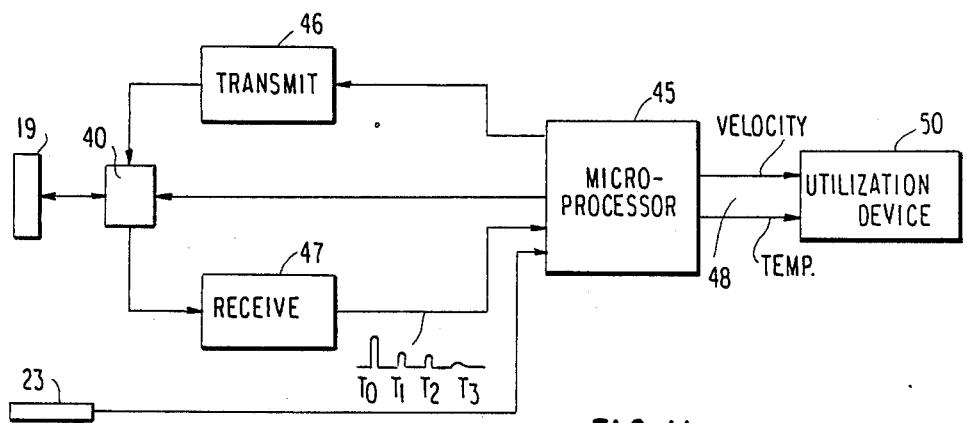
FIG. 11

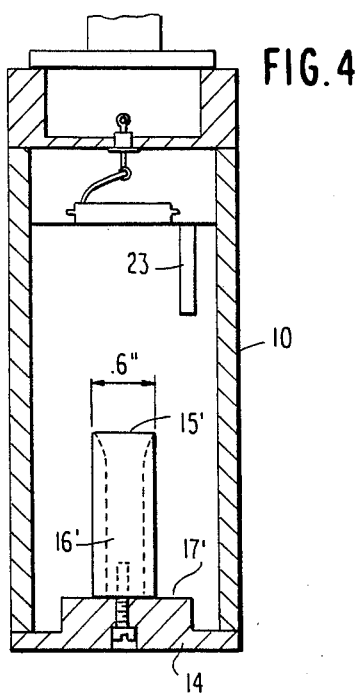
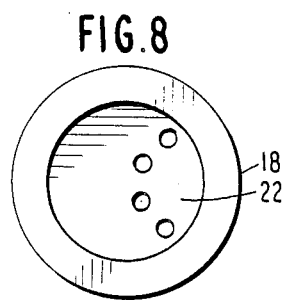
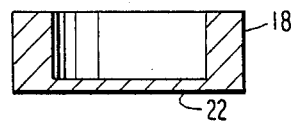
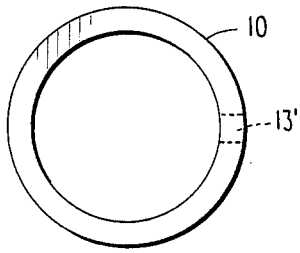
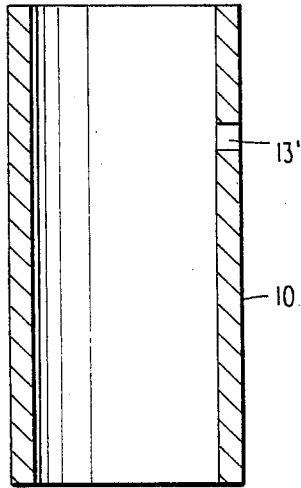
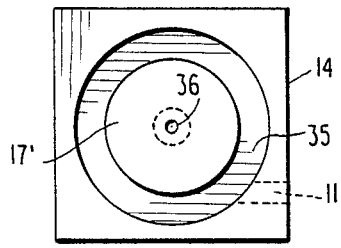
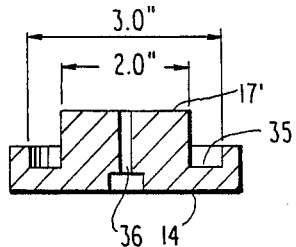

ULTRASONIC APPARATUS FOR MEASURING THE SPEED OF SOUND IN A GASEOUS MEDIUM

BACKGROUND OF THE INVENTION, PRIOR ART STATEMENT AND BRIEF DESCRIPTION OF THE INVENTION:

The velocity or speed ultrasonic pulses in gas can vary with temperature, humidity and type of gas. In the prior art, it is common practice to place a fixed reflector or reference target a short distance from an ultrasonic transducer so that in response to each transmitted pulse of ultrasonic vibrations two echoes will be received, the first from the reference target reflector which is at a fixed distance from the transducer, and the second from a surface being measured. For example, in a appartus for measuring the level of contents in a storage tank or container, the content surface is used to produce a second echo or reflection received at the transducer. An example of this type system is disclosed in Soltz U.S. Pat. No. 4,578,997 wherein a transducer disposed at a position above a liquid surface has a reference point reflector located at a fixed distance therefrom and when the transducer is excited to emit pulses, they are intercepted by the liquid surface and by the reference reflector to produce both reference and liquid echo pulses that are returned to the transducer and detected thereby. The respective transit times of the reference echo and liquid echo are determined and the ratio between these transit times are computed to provide an output representing the liquid level which is thereby rendered independent of changes in the gaseous environment.

Berg et al. U.S. Pat. No. 3,554,014 discloses ultrasonic gauging system which uses a liquid bath as a temperature compensating means and provides a standard or reference which has a length which is close to the length of the work piece being measured so that changes in the length of the work place due to temperature can be minimized.

Lynch et al U.S. Pat. No. 3,482,647 discloses a device for measuring the speed of sound in a medium in which a reflecting target is spaced from a transducer by iron-nickel alloy rods. Temperature compensation is achieved by making the ratio of temperature coefficient $C_1$ (for the rods) and $C_2$ (for the reflecting target) equal to the ratio of $L_1$ (the length of each rod) to $L_2$ (the height of the target on its supporting plate). This utilizes the differential in expansion of the spacing rods and reflecting targets to achieve temperature compensation.

Massa U.S. Pat. No. 4,210,969 discloses ultrasonic ranging apparatus in which temperature compensation is effected by a small reflecting target which is spaced by an L-shaped rod a distance $D_1$ from the transducer to produce signals which are used for calibration purposes. A similar temperature compensating system is shown in the piston position measurement device of Reuter et al U.S. Pat. No. 4,542,652, and Head et al U.S. Pat. No. 4,543,649.

Dumas U.S. Pat. No. 4,254,478 discloses ultrasonic measurement apparatus in which a velocity meter measures the speed of propagation in water. The velocity meter is not described in detail but its principle appears to be similar to Massa's.

In Skrgatic et al U.S. Pat. No. 4,388,708, an ultrasonic measurement system incorporates a temperature compensation scheme in which the reference paths and the unknown or variable path are contained in a common medium (light oil). Also see Willis U.S. Pat. No. 3,834,233, Bolton U.S. Pat. No. 3,184,969 and Dennis U.S. Pat. No. 4,248,087.

Parrish U.S. Pat. No. 4,448,202 and Soltz U.S. Pat. No. 4,470,299 disclose ultrasonic liquid level measuring systems in which a reference target or reflector is positioned at a predetermined position relative to the transducer to produce reference signal used to compute liquid level signals which are independent of changes in the gaseous environment.

In all these cases, where the single reference target is utilized, there are three basic problems. The first relates to the electrical delay time ($\tau$) through the circuit, which is not known well enought to provide adequate compensation when the velocity of ultrasonic energy is to be determined. In the present invention such electrical delay time is effectively substracted out because two accurately spaced targets are used and the spacing is rendered substantially inmmune to temperature variations. The time interval between the return echoes or pulses is an accurate measure of the velocity because the distance is accurately known and the time between the two target pulses can be accurately measured electronically and electrical time delays ($\tau$) cancel out. Secondly, the distance from the transducer face need not be accurately known since the only distance of concern is the spacing between the two targets which is rendered substantially immune to temperature variations. In the prior art, multiple reflections from other than the reference target can interfere with the measurement. In the present invention, reflections from the two reference targets and make it easier to discriminate unwanted reflections.

The object of the present invention is to provide an inexpensive, highly accurate, ultrasonic apparatus for measuring the speed of sound in a gaseous medium. According to the invention, a pair of reflectors are coaxially located and separated by a mounting member having a low coefficient of linear expansion so that the distance between the two reflecting surfaces is accurately maintained thereby eliminating the effect of temperature expansion and contraction on changing the distance between the two targets. A circuit is connected to the transducer for converting the ultrasonic energy reflections from the first and second ultrasonic reflecting surfaces to a signal corresponding to the speed of the ultrasonic energy between these two ultrasonic reflecting surfaces in the surrounding medium. Since the distance between the two reference targets is accurately known, the time of ultrasonic reflection or echoes from these two targets provide a highly accurate measure of the velocity of sound in the gaseous medium which then may be used to perform highly accurate ultrasonic measurements of distances for gauging of articles and the like. The transducer and reference targets are preferably contained in a cylindrical housing which has a diameter larger than the diameter of the largest ultrasonic reflector. Moreover, the mounting means is made of Invar metal which has a very low thermal expansion coefficient of linear expansion. It could also be a low expansion material ceramic material such as ULE TM, CERUIT TM. The chamber also includes a port in one end thereof for admitting a gaseous medium to the chamber and a second port for removing the gaseous medium from the chamber so that the gaseous medium in which the desired speed measurement is to be made is maintained inside the chamber. A conventional temperature measuring device such as a thermister or other temperature sensitive element is incorporated in the chamber so that a measurement of the gas temperature may also be made. With the velocity and temperature measurements, the ratio of the average molecular weight to the specific-heat ratio of the gas can be computed. The velocity and temperature measurements are processed by a microprocessor and supplied to a utilization device.

BRIEF DESCRIPTION OF THE DRAWINGS

The above and other objects, advantages and feature of the invention will be come more apparent when considered with the following specification and accompanying drawings wherein:

FIG. 1 is a side sectional view of a speed of sound measurement apparatus incorporating the invention, FIG. 2 is a sectional view in the direction of the numbers 2—2 of FIG. 1, FIG. 3 is a sectional view in the direction of arrows 3—3 of FIG. 1, FIG. 4 is a side sectional view of a preferred embodiment of the invention, FIG. 5 is a sectional view of the base of the assembly shown in FIG. 4, FIG. 6 is a top plan view of the base of the element shown in FIG. 5, FIG. 7 is a sectional view of the bulkhead utilized in the assembly shown in FIG. 4, FIG. 8 is a top plan view of the bulkhead assembly shown in FIG. 7, FIG. 9 is a sectional view of the barrel shown in FIG. 4, FIG. 10 is a top plan view thereof, and FIG. 11 is a block diagram of the circuitry utilized.

DETAILED DESCRIPTION OF THE INVENTION

Referring now to FIGS. 1-3, the speed of sound measurement device 10 according to the invention includes a cylindrical housing or barrel 10, having an inlet or egress port 11 of introducing the fluid or gaseous medium into the chamber 12 contained within barrel 10 and an outlet or egress port 13 for removing the gaseous medium. It will be appreciated that the device can be located in a position relative to the fluid medium in which the speed of sound is to be measured where the chamber 12 can be eliminated. At one end of the barrel 10 is a base member 14 to which is secured a target formed of a material having a very low coefficient of temperature expansion such as Invar metal or a nonmetal, such as a ceramic which has a substantially zero coefficient of temperature expansion. The upper surface 15 of target bar 16 is polished to serve as a first reflector or acoustic target and the concentric portions 17 of the facing surfaces of the base 14 is likewise polished to serve as a second ultrasonic reflector. The spacing and mounting member 16, having a low coefficient of linear expansion spaces the two ultrasonic reflecting surfaces a predetermined distance apart so that the time spacing between the ultrasonic energy pulses reflected from these two targets and detected by the transducer 19 provides an extremely accurate measurement of the velocity of sound in the gaseous medium. The opposite end of the housing 10 is provided with a bulkhead 18 in which is mounted ultrasonic transducer 19 which, in this preferred embodiment, is a Polaroid TM electrostatic transducer having an electrostatic element 20 therein and a lower perforated grill 21 through which the ultrasonic pressure waves pass in the gaseous medium.

A temperature sensitive element 23 is mounted in dependent fashion from the lower surface 22 of bulkhead 18 and provided a signal corresponding to the temperature of the medium. The upper annulus of bulkhead 18 forms a chamber for the transducer 19 and a pressure equalizing vent 24 is formed adjacent thereto. A second bulkhead member 26 has an annular rim 27 for containing a printed circuit board 28 upon which various conventional electronic components 29 are mounted. Lead wires 31 from the transducer 19 are coupled to the bulkhead wall 26 using conventional insulated through wall circuit coupling elements, as shown in FIG. 4, to connect the transducer to the electronic circuitry on printed circuit board 28. Likewise, leads 32 from the temperature measuring element 23 pass through bulkhead wall 26 and are likewise connected to the printed circuit board and the signals are conveyed to a utilization device from the printed circuit board 28 via a cable 34.

In operation, the fluid medium such as air ingresses through inlet or egress port 11 in the chamber of barrel 10 from a device in which the velocity of sound is desired to be measured and exiting through egress or outlet port 13. The transducer 19 is excited by electrical energy from the circuitry on printed circuit board 28 to emit ultrasonic pulses (in about the 50 kHz range, for example). These pulses are transmitted through the gaseous medium in the chamber to first impinge upon and be reflected from target 15 and then to impinge upon and be reflected from target 17. Since the known distance or spacing between the two targets is maintained constant and unaffected by temperature changes because of the low expansion characteristic of mounting element 16, between reflectors or echoes between the two reflecting targets 15 and 17 thus is an extremely accurate measure of the speed of sound in a given fluid medium. Any electrical time delays ($\tau$) cancel out Thus, the distance of the two reflecting surfaces 15 and 17 from the transducer is not relevant in the present invention. Only the distance between the two reflecting surfaces 15 and 17 is relevant and that distance is maintained substantially constant by the low temperature coefficient of expansion of the mounting block 16.

PREFERRED EMBODIMENT

The preferred embodiment is shown in detail in the assembly drawings shown in FIGS. 4-10. As there shown, the barrrel 10 is made from an aluminum alloy which has been coated with gold iridite. In this preferred embodiment, the base 14 which is shown in detail in FIG. 5, has an annular groove or recess 35 which is formed below the upper surface or pedestal surface 17' which serves as the second reflecting surface and has a centrol bore 36 through which passes a screw for securing the mounting member 16' so that the targets 15' and 17' are axially aligned with the ultrasonic beam emanating from transducer 19. Moreover, the two targets are coaxial with themselves with the target 15' having an exemplary dimension of about 0.6 inch and the pedestal having a diameter of about 2 inches and the anular groove or recess 35 having a diameter of about 3 inches. The Polaroid TM transducer 20 having a dimension of about 1-½ inches and a beam spread of about 10 degrees so that the two targets have surface areas which are substantially equally impinged upon by the pressure wave to result in echoes or return signals from the two target surfaces. As noted earliers, in this preferred embodiment, there is an annular or groove 35 formed in the base member 14 which permits the diameter of the barrel 10 to be substantially smaller than would normally be the case to take into account and minimize the effect of unwanted reflection. In other words, it is a means of enhancing the reflections from targets 15' and 17' by minimizing the effect of unwanted reflections.

Referring now to FIG. 11, the transducer 19 is controlled by a transmit receive switch 40 which, in turn, is controlled by microprocessor 45. Microprocessor 45 also controls the transmit power unit 46 at the same time that transmit switch 40 is decoupling the receive unit 47 from the transducer 19. It is noted that in this embodiment, the transducer 19 serves the dual function of generating the pressure and rarefaction waves for transmission towards the targets 15' and 17' and for receving the echoes and transducing them to electrical signals. Transmit receive switch 40 couples the received echoes to receive unit 47 which may, if desired, have the usual automatic gain control and other conventional signal conditioning functions incorporated therein. The signals transmitted to the microprocessor include a signal $T_o$ indicative of the time of transmission of the pulse from transducer 19. Echo T1 is the echo from target 15' and pulse T2 is the echo from target 17'. Echo T3 is a small echo from the annular recess 35 and can easily be discriminated against. With the distance between targets 15 and 17 known and constant, the time interval between T1 and T2 is directly proportional to the velocity of sound in the gaseous medium introduced into ingress port 11 and is highly accurate since the only variables in the measurement is the variation in the length of mounting bar 16 which, has an extremely coefficient of temperature expansion.

A separate measurement of temperature is made by a temperature measuring instrument 23 and is supplied to the microprocessor 45 and is used to determine the specific heat of the gaseous medium. A microprocessor 45 processes the velocity time measurement of the signal between the two reflection surfaces 15 and 17 and the temperature measurement to produces a speed of sound measurement signal on output line 48 which is supplied to a utilization device 50. Utilization device 50 may be other ultrasonic distance measuring or gauging devices, display devices or a computer where the measurements may be used for other purposes.

GAS ANALYZER

For gas analyses, the invention can measure the average molecular weight (M) of a gas when the specific-heat ration (γ) is known. The device measures the speed of sound (c) and the absolute temperature (T) of the gas and microprocessor 45 computes:

$$\frac{\overline{M}}{\gamma} = \frac{RT}{c^2}$$

where R is the universal gas constant. Precision of the measurement is better than 0.1%.

While there has been shown and described a preferred embodiment of the invention, it will be appreaciated that many changes and modifications may be made in the basic invention without departing form the essential spirit and scope of the invention as defined in the appended claims.

What is claimed is:
1. Ultrasonic apparatus for measuring the speed of sound in a gaseous medium, comprising:
   (1) a closed chamber having a first end and an opposing end,
   (2) an ultrasonic transducer mounted at said first end of said closed chamber,
   (3) a first ultrasonic reflecting surface mounted at said opposing end of said closed chamber,
   (4) a second ultrasonic reflecting surface,
   (5) a mounting member having a low coefficient of linear expansion for mounting said second ultrasonic reflecting surface at a predetermined distance spaced from said first ultrasonic reflecting surface and closer to said ultrasonic transducer, and
   (6) circuit means connected to said transducer for converting ultrasonic energy reflections from said first and said second ultrasonic reflecting surfaces to a signal corresponding to the speed of ultrasonic energy in said gaseous medium between said ultrasonic reflecting surfaces.
2. Ultrasonic apparatus as defined in claim 1 wherein said closed chamber includes a circular cylinder which has its diameter larger than the diameter of said first ultrasonic reflecting surface.
3. Ultrasonic apparatus as defined in claim 1 said closed chamber surrounding said transducer and ultrasonic reflecting surfaces, fluid inlet port means in said closed chamber for admitting said gaseous medium to said closed chamber and fluid outlet port means for removing gaseous medium from said closed chamber.
4. Ultrasonic apparatus for measuring the speed of sound in a gaseous medium, comprising:
   (1) a chamber,
   (2) an ultrasonic transducer mounted at said first end of said chamber having a first end and an opposing end,
   (3) a first ultrasonic reflecting surface mounted at said opposing end of said chamber,
   (4) a second ultrasonic reflecting surface,
   (5) a mounting member having a low coefficient of linear expansion for mounting said second ultrasonic reflecting surface at a predetermined distance spaced from said first ultrasonic reflecting surface and closer to said ultrasonic transducer, and
   (6) circuit means connected to said transducer for converting ultrasonic energy reflections from said first and said second ultrasonic reflecting surfaces to a signal corresponding to the speed of ultrasonic energy between said ultrasonic reflecting surfaces and wherein said ultrasonic
5. Ultrasonic apparatus for measuring the speed of sound in a gaseous medium, comprising:
   (1) a chamber,
   (2) an ultrasonic transducer mounted at said first end of said chamber having a first end and an opposing end,
   (3) a first ultrasonic reflection surface mounted at said opposing end of said chamber,
   (4) a second ultrasonic reflecting surface,
   (5) a mounting member having a low coefficient of linear expansion for mounting said second ultrasonic reflecting surface at a predetermined distance spaced from said first ultrasonic reflecting surface and closer to said ultrasonic transducer, and
   (6) circuit means connected to said transducer for converting ultrasonic energy reflections from said first and said second ultrasonic reflecting surfaces to a signal corresponding to the speed of ultrasonic energy between said ultrasonic reflecting surfaces and wherein said mounting member is made of Invar metal.

6. Ultrasonic apparatus for measuring the speed of sound in a gaseous medium, comprising:
(1) a closed chamber,
(2) an ultrasonic transducer mounted at one end of said closed chamber,
(3) a first ultrasonic reflecting surface mounted at an opposite end of said closed chamber,
(4) a second ultrasonic reflecting surface,
(5) a mounting member having a low coefficient of linear expansion for mounting said second ultrasonic reflecting surface at a predetermined distance spaced from said first ultrasonic reflecting surface and closer to said ultrasonic transducer, and
(6) circuit means connected to said tranducer for converting ultrasonic energy reflections from said first and said second ultrasonic reflecting surfaces to a signal corresponding to the speed of ultrasonic energy between said ultrasonic reflecting surfaces and means for minimizing ultrasonic reflections from other than said first and said second ultrasonic reflecting surfaces including an annular groove surrounding said first reflecting surface and spaced further from said transducer than either of said reflecting targets and defining an annular space for attenuating said reflecting other than those from said first and said second reflecting surfaces.

7. Ultrasonic apparatus as defined in claim 6 including first port means in said chamber for admitting said gaseous medium to said chamber and second port means for removing gaseous medium from said chamber.

8. Ultrasonic apparatus for measuring the speed of sound in a fluid medium comprising:
an ultrasonic transducer for emitting ultrasonic energy in a predetermined direction and receiving reflected, ultrasonic energy and producing electrical signals corresponding to said reflected ultrasonic energy,
mounting means for mounting said ultrasonic transducer at a fixed location,
a first ultrasonic reflecting surface,
a second ultrasonic reflecting surface,
a mounting member which is substantially free of dimensional changes due to temperature variations for maintaining a fixed distance relation between said first and second ultrasonic reflecting surfaces such that both said reflecting surfaces face said ultrasonic transducer with said second ultrasonic reflecting surface being closer by said fixed distance relation to said ultrasonic transducer than said first ultrasonic reflecting surface, and
circuit means connected to said transducer for converting ultrasonic energy reflections from said first and said second ultrasonic reflecting surfaces to an electrical signal corresponding to the speed of ultrasonic energy in said fluid medium.

9. Ultrasonic apparatus as defined in claim 8 wherein said mounting member is made of a ceramic.

10. Ultrasonic apparatus for measuring the speed of sound in a fluid medium comprising:
an ultrasonic transducer for emitting ultrasonic energy in a predetermined direction and receiving reflected ultrasonic energy and producing electrical signals corresponding to said reflected ultrasonic energy,
mounting means for mounting said ultrasonic transducer at a fixed location,
a first ultrasonic reflecting surface,
a second ultrasonic reflecting surface,
a mounting member which is substantially free of dimensional changes due to temperature for maintaining a fixed distance relation between said first and second ultrasonic reflecting surfaces such that both said reflecting surfaces face said ultrasonic transducer with said second ultrasonic reflecting surface being closer by said fixed distance relation to said ultrasonic transducer than said first ultrasonic reflection surface, and
circuit means connected to said transducer for converting ultrasonic energy reflections from said first and said second ultrasonic reflecting surfaces to an electrical signal corresponding to the speed of ultrasonic energy in said fluid medium and wherein said mounting member is made of Invar metal.

11. Ultrasonic apparatus for measuring the speed of sound in a fluid medium comprising:
an ultrasonic transducer for emitting ultrasonic energy in a predetermined direction and receiving reflected ultrasonic energy and producing electrical signals corresponding to said reflected ultrasonic energy,
mounting means for mounting said ultrasonic transducer at a fixed location,
a first circular ultrasonic reflecting surface,
a second circular ultrasonic reflecting surface coaxially and concentric with respect to said first circular ultrasonic reflector and said ultrasonic transducer.
a temperature insensitive mounting member for maintaining a fixed distance relation between said first and second circular ultrasonic reflecting surfaces such that both said reflecting surfaces face said ultrasonic transducer with said second ultrasonic reflecting surfaces being closer by said fixed distance relation to said ultrasonic transducer than said first ultrasonic reflecting surface, and
circuit means connected to said transducer for converting ultrasonic energy reflections from said first and said second ultrasonic reflecting surfaces to an electrical signal corresponding to the speed of ultrasonic energy in said fluid medium.

* * * * *